United States Patent [19]

Matula

[11] 4,180,766
[45] Dec. 25, 1979

[54] RECIPROCATING LINEAR DRIVE MECHANISM

[75] Inventor: Jerry Matula, Culver City, Calif.

[73] Assignee: Printronix, Inc., Irvine, Calif.

[21] Appl. No.: 765,873

[22] Filed: Feb. 4, 1977

[51] Int. Cl.² .......................................... H02K 33/00
[52] U.S. Cl. ................................. 318/128; 318/132; 310/27
[58] Field of Search ............... 318/135, 127, 128, 130, 318/132, 129; 310/27; 101/93.04, 93.09

[56] References Cited

U.S. PATENT DOCUMENTS

| | | | |
|---|---|---|---|
| 3,331,239 | 7/1967 | Larsen et al. | 318/132 X |
| 3,452,259 | 6/1969 | Shtrikman et al. | 318/128 X |
| 3,486,094 | 12/1969 | Zane | 318/128 |
| 3,549,966 | 12/1970 | Wilson | 318/135 |
| 3,596,593 | 8/1971 | Wada | 101/93.09 X |
| 3,748,553 | 7/1973 | Reiner | 318/128 |
| 3,872,333 | 3/1975 | Imbert et al. | 310/27 |
| 3,941,051 | 3/1976 | Barrus et al. | 101/93.04 |
| 3,976,923 | 8/1976 | Firtion et al. | 318/128 |

*Primary Examiner*—Donovan F. Duggan
*Attorney, Agent, or Firm*—Fraser and Bogucki

[57] ABSTRACT

A printer hammer bank for a dot matrix or other type printer is reciprocated at high speed along a printing position by a low mass, low inertia servo-controlled drive. Precise control is maintained even though a positive drive structure is not used. A reciprocable drive mechanism supporting the hammer bank is mounted to undergo free flight with low friction along a selected axis parallel to a printing line. At each limit of movement, the drive mechanism encounters resilient stop members which reverse the direction of motion of the drive mechanism and included hammer bank following a natural cosine function of the spring mass of the stop members and with low kinetic energy loss. Losses occurring during reversal are compensated by an energy impulse from a coupled linear electromagnetic drive and an associated velocity servo system which eliminates the need for close servo control during reversal, allowing the drive mechanism to rebound naturally. During reversal the servo system which is driven into saturation senses the occurrence of zero motion of the drive mechanism and reverses the direction of energization of the electromagnetic drive. Hammer bank velocity during movement through a print span is sensed, and further kinetic energy is supplied by the servo system as required to compensate for friction losses, braking effects during printing, and other causes of variation in hammer bank speed.

3 Claims, 6 Drawing Figures

RECIPROCATING LINEAR DRIVE MECHANISM

BACKGROUND OF THE INVENTION

This invention relates to devices for undergoing reciprocating linear motion at controlled speed, and particularly to dot matrix printers having reciprocating hammer banks.

It has been known for some time to reciprocate a printing head along a line of characters to be printed, particularly with single printing heads using long flexible wires that are arranged to print all dots in a vertical column concurrently. Lead screws, belt drives, and other mechanisms have been suitable for these purposes, because the primary movable element has usually been a relatively small guide structure, near the paper, for the wires. More recently, line printers of the dot matrix type have been introduced that use a bank of print hammers reciprocated back and forth along a printing line, with each hammer serially printing the dots in the horizontal rows of one or more characters during movement in one or both directions. Early versions of this printer employed a stepping drive which incremented the hammers between successive horizontal positions so as to insure the desired dot registration. The hammers were movable relative to a stationary bank of magnetic actuators which received the printing impulses.

It has been demonstrated, however, in U.S. Pat. No. 3,951,051, that substantial improvements in cost, system operation and versatility can be achieved by "on the fly" printing using reciprocation of a hammer bank structure incorporating the magnetic actuators. As described in U.S. Pat. No. 3,951,051, the hammer bank movement spans a number of character positions, and during movement across the character positions the hammer bank is driven at substantially constant speed. A position encoder responsive to hammer bank position is used to generate timing signals to demarcate the column locations within the dot matrix patterns. Because the characters are small and the dot matrix patterns must be spatially reproduced with accuracy for good character readability, predictable speed control and precise position indexing are required for good print quality. The speed across the row of printing positions need not be uniform, but is preferably so in order to achieve maximum data throughput rates. Thus in the referenced system, a trapezoidal velocity function is adhered to, with the hammer bank being held at constant speed in one direction, then uniformly decelerated to a stop and accelerated to a constant speed in the opposite direction.

The acceleration and deceleration rates are high, as is the speed in each direction considering the short travels involved. With a printer operating at 40 to 400 lines per minute and each hammer printing 3 to 6 characters in a 5×7 dot pattern, the hammer bank must be reciprocated of the order of 10-50 times per second at 10-30 inches per second over a distance of 0.3 to 0.6 inches.

In the system of the referenced patent, the desired hammer bank shuttle motion is imparted by a counterbalanced, cam controlled positive drive mechanism. The mechanism has sufficient mass and drive power to maintain substantially constant speed despite the variable braking effect that is introduced during printing and the effect of spring loaded cam follower bearings. The controlling cam surface must be precisely generated for the desired trapezoidal motion, although substantial wear can have an adverse effect on the nature of the motion. With this arrangement, a large drive motor and flywheel are desirable for stability, and there are practical limitations on the shuttle rate that can be achieved. These factors together establish certain cost/performance criteria which represent a significant part of the cost of the overall system. Thus for particular applications, including both lower and higher line printing rates, it would be highly advantageous to employ a drive mechanism that would afford substantial economies in cost if the needed performance could be achieved.

SUMMARY OF THE INVENTION

A reciprocating linear drive mechanism in accordance with the invention employs a low inertia, substantially free floating reciprocating mechanism utilizing a resilient rebound system to reverse direction at each limit of travel, and a servo system to maintain speed control during movement between the opposite limits. After linear motion in one direction, the drive mechanism engages the resilient rebound device at a limit position, and direction is reversed with little loss of kinetic energy. Such energy as is lost may be restored concurrently with acceleration by an impulse from a linear electromagnetic actuator. The linear velocity is sensed and servo controlled using the electromagnetic actuator during linear motion in the opposite direction.

The reciprocating mechanism undergoes generally free flight with energy being supplied only as required to maintain the nominal speed in the face of minor friction losses and the like. The mechanism rebounds with the natural cosine function of the spring mass of the resilient rebound device to minimize energy losses during reversal. The servo control energizes the linear electromagnetic actuator with a current which always has the proper polarity and value to compensate for losses. The current is automatically reversed at the point of zero motion of the reciprocating mechanism during each rebound. Precise control of the current during linear motion of the reciprocating mechanism is not necessary during reversal due to the nature of the servo system which saturates during most of the rebound interval.

In a more specific example of a reciprocating linear drive mechanism in accordance with the invention as used in a line printer, a hammer bank is mounted for free reciprocating motion between a pair of linear bearings. At one end of the printer, a hammer bank shaft extending along the axis of reciprocation supports a coaxial coil which is in magnetic interaction with a magnetic path including a permanent magnet to define a linear actuator drive. A spool mounted on the hammer bank shaft includes a pair of facing end shoulders that are separated by the effective length of the printing stroke. A number of resilient rebound fingers mounted on a fixed base outside the spool extend into the space between the end shoulders, and are positioned to engage one of the shoulders at each end of the printing stroke. Thus the rebound fingers absorb the kinetic energy of the hammer bank and reverse its direction. A position encoder and a linear tachometer are mounted on the mechanism so as to reciprocate with the hammer bank, with the position encoder providing timing signals for printing and speed reference and the linear tachometer indicating the hammer bank velocity. Control circuits generate an energy restoring impulse which is applied to the linear actuator concurrent with each accelerator interval, so as to insure the proper initial printing velocity. In moving across the print span, however, the linear velocity is servo controlled and maintained within predetermined limits. This drive mechanism affords substantial cost economies for many applications, provides the needed high speed short travel motion with low power consumption and is stable in operation. The basic design may be adapted to a number of different system configurations.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
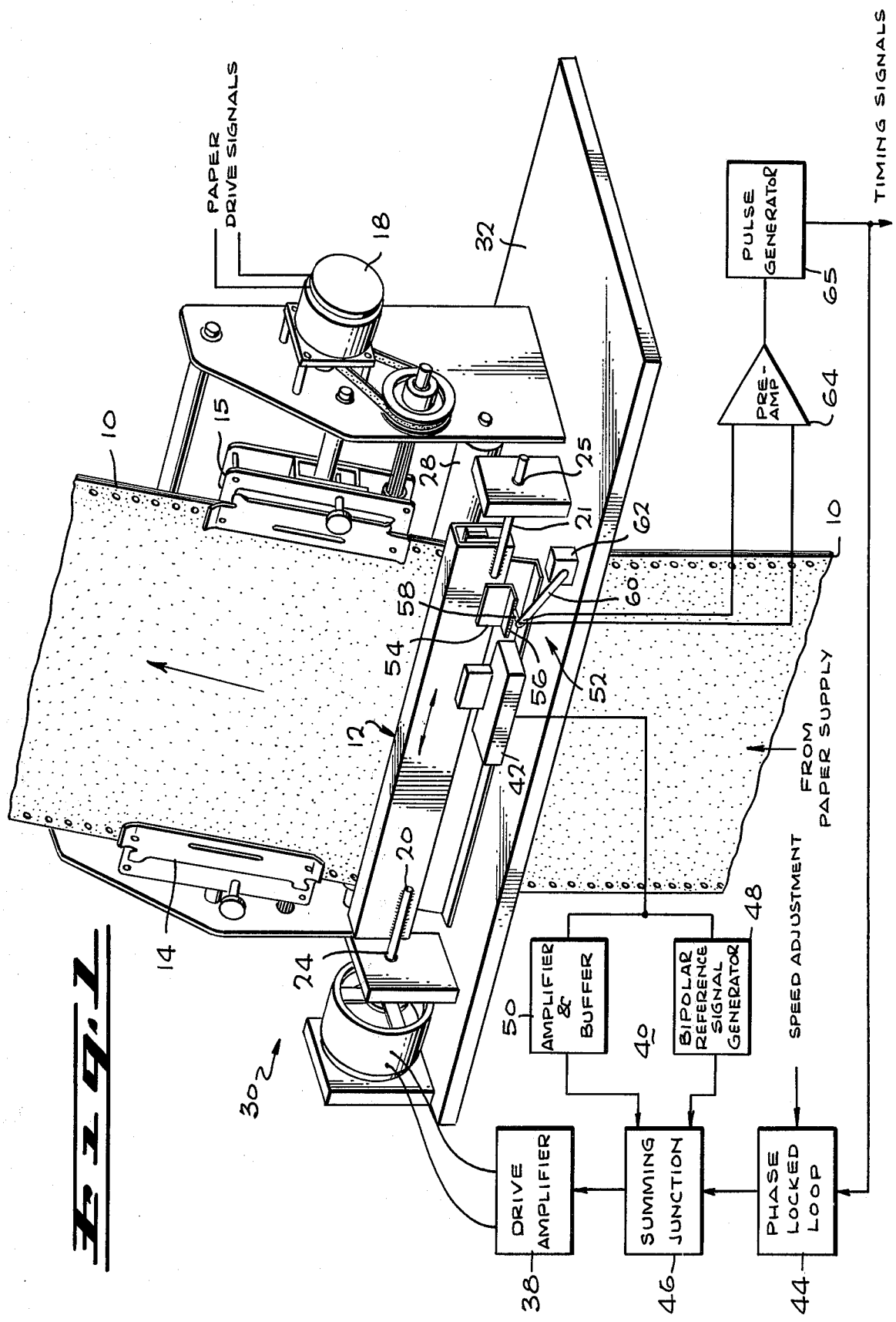
FIG. 1 is a perspective view, partially broken away and somewhat simplified, of a printer system using a drive mechanism in accordance with the invention.

A drive system in accordance with the invention is shown as employed in conjunction with a dot matrix printer having a multiple head hammer bank of the type disclosed in U.S. Pat. No. 3,951,051. Perforated multipart paper 10 is advanced transversely relative to a printing line disposed in facing relation to a hammer bank 12 which reciprocates along the printing line axis. Print wires or styli extending from the hammer bank 12 impact a ribbon (not shown for simplicity) to record characters and other patterns on the original of the paper 10, with carbon being used to provide the desired number of additional copies. The paper 10 is advanced between successive horizontal rows by tractors 14, 15 driven in conventional fashion by a drive motor 18 in response to paper drive signals that are generated at the conclusion of each traversal of the hammer bank 12 across the paper. The hammer bank 12 is supported at each longitudinal end by a coupled stub support shaft 20, 21, each mounted to reciprocate within an adjacent linear bearing 24, 25. On the opposite side of the paper 10 from the hammer bank 12 is a platen 28 for absorbing the force of the printing impacts.

The arrangement of FIG. 1 comprises one example of the manner in wich the hammer bank 12 or similar devices can be mounted to undergo reciprocating linear motion, and other arrangements are possible. For example, bearing blocks containing linear bearings can be mounted on the side of the hammer bank 12 at the opposite ends thereof for sliding movement along a shaft which is rigidly mounted relative to the base or frame of the printer system.

At a first end of the hammer bank 12, designated arbitrarily inasmuch as either longitudinal end may be employed, a linear actuator or voice coil type of drive 30 is coupled to the stub shaft 20 on the opposite side from the linear bearing 24. The linear bearings 24, 25 and the linear actuator 30 are mounted on a frame 32, depicted generally in FIG. 1 although the particular arrangement is not of significance inasmuch as the elements need only have a fixed spatial relation. Details of the linear actuator 30 are set forth relative to the description of FIGS. 2–4. However, the linear actuator 30 includes a drive coil which is energized by a drive amplifier 38 controlled by a servo circuit 40 receiving a velocity feedback signal from a linear tachometer 42 responsive to the actual velocity of the hammer bank 12.

The linear tachometer 42 may be any one of a number of available commercial devices utilizing optical or magnetic means to generate a DC velocity signal for application to the servo circuit 40. In one such device found to be quite suitable, a rod is fixedly attached to the hammer bank 12 so that a magnet attached to the end of the rod moves within a pair of adjacent coils attached to the frame 32 as the hammer bank 12 undergoes motion. The adjacent coils are coupled together to reject common mode signals and thereby provide a signal representing the rate of movement of the magnet relative to the coils.

The servo circuit 40 operates to generate an error signal controlling the drive amplifier 38, in response to a deviation of the sensed velocity signal from a preset reference provided by a phase locked loop 44 coupled to a summing junction 46 within the servo circuit 40. A bipolar reference signal generator 48 responds to the tachometer 42 to provide the summing junction 46 with a reference signal having a polarity determined by the direction of motion of the hammer bank 12 and a value determined by the phase locked loop 44. A signal representing the actual speed of the hammer bank 12 is provided to the summing junction 46 by an amplifier and buffer 50 coupled to the tachometer 42. The summing junction 46 combines the signals provided thereto to generate an error signal which is applied to the linear actuator 30 via the drive amplifier 38 to restore kinetic energy lost during the rebound movement of the hammer bank 12 and to maintain the nominal speed of the hammer bank 12 in the face of some friction and other losses.

A position encoder 52 is also coupled to the hammer bank 12. The position encoder 52 comprises an L-shaped rack 54 of magnetic material mounted on the hammer bank 12 and having a toothed outer edge 56 disposed adjacent a magnetic transducer 58. The transducer 58 which is mounted at a fixed location relative to the frame 32 by an arm 60 and a coupled block 62 contains a permanent magnet for creating a magnetic field in the region of the toothed edge 56 and a coil for providing signals to a preamplifier 64 in response to movement of the L-shaped rack 54 relative to the transducer. Each tooth at the edge 56 generates a sinusoidal signal within the coil of the transducer 58 which is amplified by the preamplifier 64 and converted to a pulse by a pulse generator 65. The resulting pulses produced by the generator 65 comprises timing signals for the system. The timing signals are useful in synchronizing actuation of individual hammers within the hammer bank 12 with the relative position of the hammer bank 12 along the print axis. In addition the timing signals are applied to the phase locked loop 44 so as to synchronize the oscillations of the phase locked loop 44 with the timing signals and thereby eliminate the need to calibrate the tachometer 42.

The position encoder 52 comprises one example of apparatus that can be used to provide timing signals, with other arrangements being possible. In one alternative arrangement a pair of threaded magnetic shafts having slightly varying pitches is used. The first shaft is mounted on the hammer bank 12 and the second shaft is fixedly mounted relative to the base 32. A permanent magnet coupled to the second shaft provides a magnetize flux path extending through the opposed toothed portions of the shafts. As the movable first shaft shuttles longitudinally relative to the fixed second shaft, the differently pitched teeth provide a flux path of variable permeability, with maxima and minima at regular, finely divided increments of movement. The changes in permeability are sensed by a coil coupled to the fixed second shaft, and the induced current is fed to the preamplifier 64 for conversion into pulses by the pulse generator 65.

In the circuits for the position encoder 52, conventional techniques may be utilized to generate the pulses that denote separate increments of movement. Thus, zero crossing detectors or peak detectors may be utilized to identify particular signal characteristics indicative of increments of motion, and phase shifters or delay circuits may be utilized to adjust the time of occurrence of the pulses.

Figure 2:
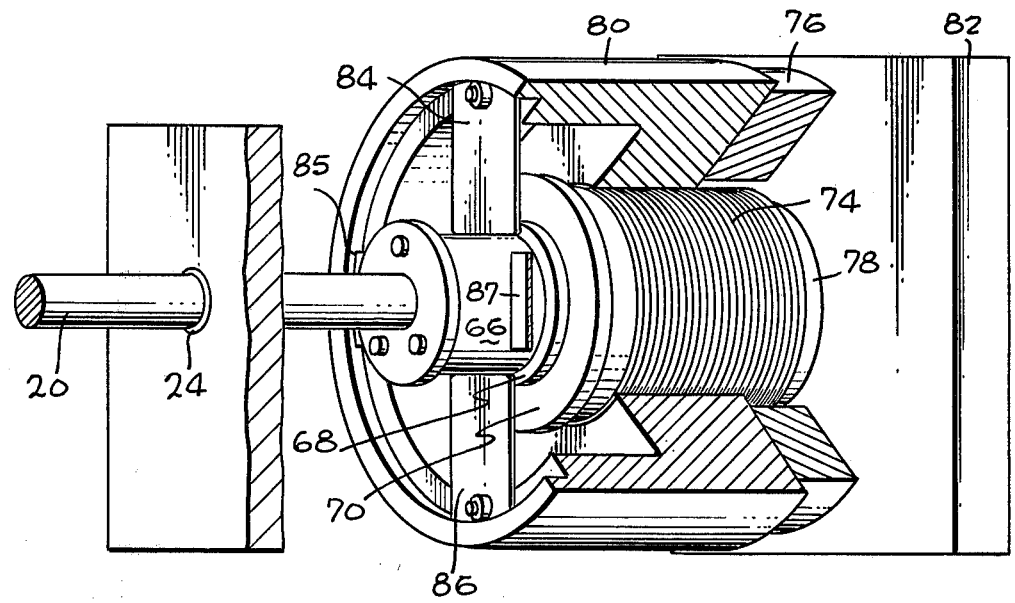
FIG. 2 is an enlarged perspective view, partially broken away, of details of the printer drive mechanism in the system of FIG. 1.
Figure 3:
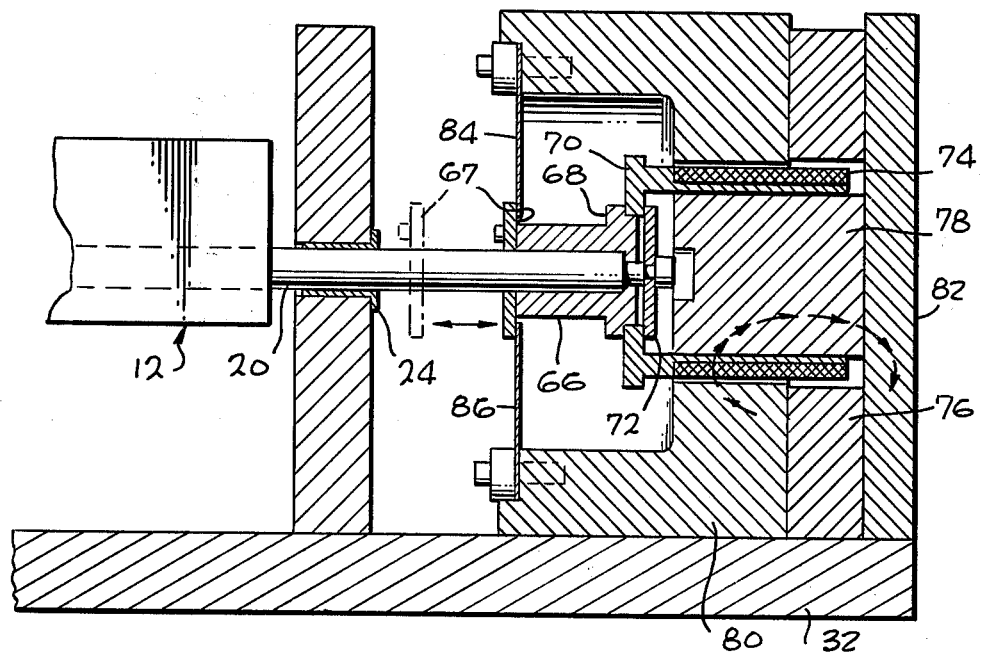
FIG. 3 is a side sectional view of the printer drive mechanism of FIG. 2.
Figure 4:
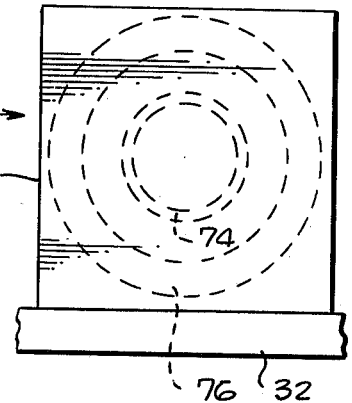
FIG. 4 is an end view of the printer drive mechanism of FIGS. 2 and 3.

In the linear actuator drive mechanism, shown in detail in FIGS. 2-4, one support shaft 20 for the hammer bank 12 extends through the associated linear bearing 24. The free end of the shaft 20 extends adjacent a magnetic circuit forming a part of the linear actuator 30. A spool 66 having facing interior end shoulders 67, 68 is mounted concentric with and about the free end of the support shaft 20. The facing end shoulders 67, 68 are spaced apart by the print span to be traversed by the hammer bank 12. A bobbin 70 of cylindrical form is secured by an end cap 72 to the end of the spool 66 that is farthest from the hammer bank 12. The bobbin 70 supports an encompassing energizing coil 74 which is coupled to the external drive amplifier 38 of FIG. 1. The coil 74 is disposed to intercept the magnetic field established about an annular permanent magnet 76 which is concentric with the central axis of the support shaft 20, being disposed within an air gap established between a central core 78 and a cylindrical hub 80 having a flange facing in the direction of the hammer bank 12. As best seen in FIG. 3, the flux path about the permanent magnet 76 extends through a portion of the hub 80, intercepts the coil 74 and returns via the center core 78 and an end pole piece 82 to the permanent magnet 76. It wll be recognized that this portion of the mechanism is structured to function as a linear electromagnetic or voice coil type of drive.

A number (here four) of resilient metal strip springs 84–87 respectively are mounted on the outer surface of the flange of the hub 80. Each spring 84–87 is directed radially inwardly toward the spool 66, and has a free end interposed in the shuttle path of the facing end shoulders 67, 68. Each of the end shoulders 67, 68 may include facing material of a softer but abrasion resistant character, such as a resilient polypropylene coating. As the end shoulders 67, 68 impact upon the opposite sides of the springs, therefore, the impact noise is reduced and an additional spring effect may be imparted.

The spring constant of the strip springs 84–87 is chosen to provide a desired short rebound distance and an adequately high return force over that distance. Relative to the mass of the hammer bank and the loads encountered, the fatigue limit of the material is far greater than required. Further, the loss of kinetic energy in the rebound motion can be kept fairly low, such as less than 10% and in the example shown approximately 7%.

In the operation of the linear actuator 30, the stub shafts 20, 21 and the hammer bank 12 are relatively freely movable along the longitudinal axis and essentially provide a free floating base for the hammer bank 12. The field generated by the coil 74 opposes or reinforces the permanent magnet field, generating linear motion of the hammer bank 12 in a typical voice coil operation. Only a few traverses of the hammer bank 12 are needed to bring it up to speed, inasmuch as little energy is lost during the rebound action. Consequently, only a small voice coil mechanism having a relatively low current drain suffices to initiate and maintain the hammer bank operation. Substantial braking can occur during the printing action if all the hammer actuators are operated during the printing mode. However, the servo control is operated during these intervals to restore the energy lost due to the braking action of the hammer impacts. Consequently, velocity control is maintained with low power drain. Inasmuch as the power demands are only intermittent, the energy losses due to heating of the magnetic circuit are also limited.

In a practical example of the system, it was desired to have a 0.6" print span, with an 18" per second velocity in each direction, giving an approximately 45 millisecond interval for the traverse of the print span. It was further desired to reverse direction with a travel of approximately 0.2" maximum and in approximately 10 milliseconds. Given these stated conditions, an approximately 40 lb. acceleration force would be required for a typical hammer bank mass with a positive drive system. With the low mass, low inertia and servo-controlled system of the present invention, however, the linear actuator need only generate approximately 4 lbs. of force to meet the desired criteria. In consequence of these factors, and the relatively low costs of the electronic circuitry that are utilized, substantial cost economies result, particularly for lower speed (e.g. 150 lines per minute) line printers. The mechanism is quiet and essentially vibration free.

Figure 5:
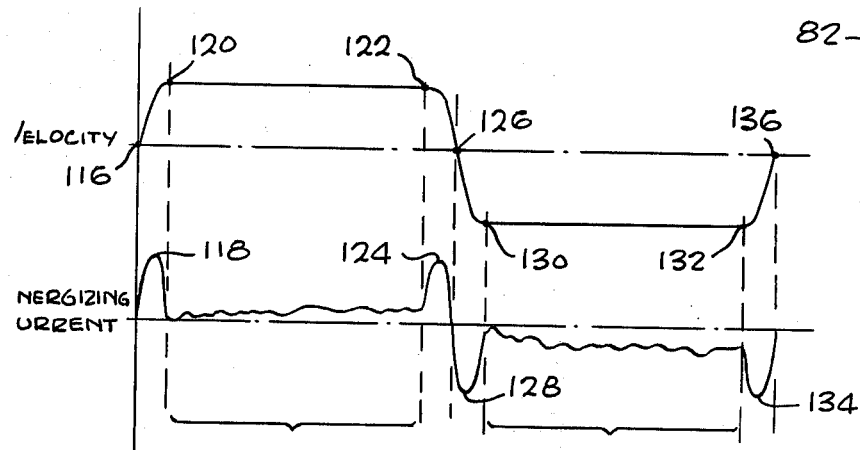
FIG. 5 is a diagrammatic view showing velocity variations and energizing signal variations with time during the reciprocating movement of a drive mechanism in accordance with the invention.
Figure 6:
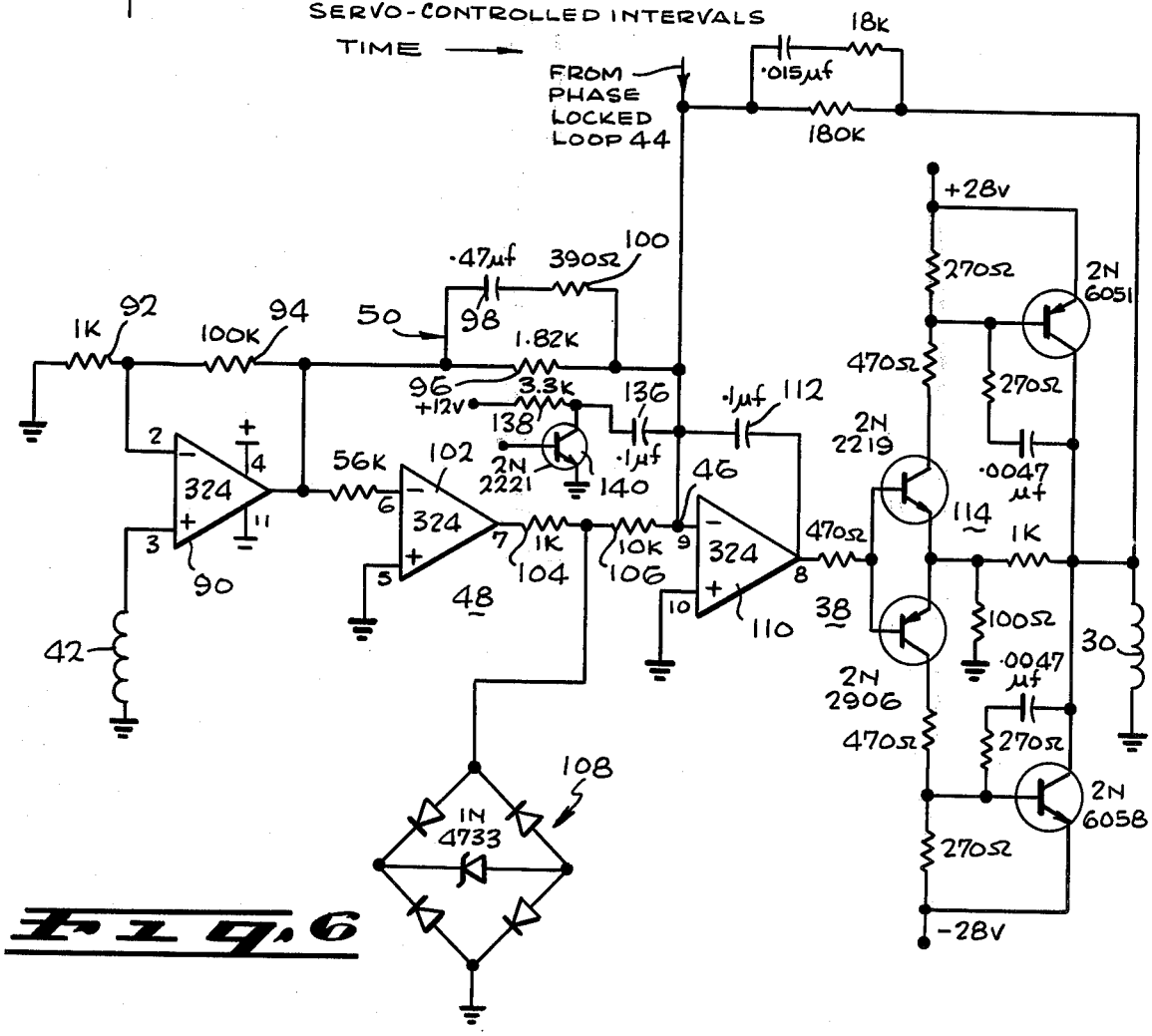
FIG. 6 is a schematic diagram of a control circuit including a servo circuit for the printer drive mechanism in the system of FIG. 1.

Reference may now be made to FIGS. 5 and 6. FIG. 5 illustrates the relationship between the hammer bank velocity and the energizing current waveforms applied to the linear actuator during typical printing motions in both directions. FIG. 6 illustrates the control circuit including the servo circuit 40 for producing the current waveforms shown in FIG. 5. It will be seen that an essentially cosine velocity characteristic is achieved during shuttle reversal in that the hammer bank shuttles in one direction at constant velocity, decelerates to zero and smoothly accelerates to the desired velocity in the opposite direction. The current energizing waveforms include a brief pulse during the acceleration interval in each direction to restore the energy lost during rebound followed by a variable level which is of a compensatory nature to overcome system friction, braking effects and the like. In practical systems it is feasible to maintain the hammer bank velocity across the print span within a ±2% speed variation.

As shown in FIG. 6 the tachometer 42 is represented by a coil coupled between ground and the positive input of an amplifier 90 forming a part of both the bipolar reference signal generator 48 and the amplifier and buffer 50. The other input of the amplifier 90 is coupled to the junction between a pair of resistors 92 and 94. The other end of the resistor 92 is coupled to ground, and the other end of the resistor 94 is coupled to the output of the amplifier 90 as well as to the summing junction 46 via a resistor 96 coupled in parallel with the serial combination of a capacitor 98 and a resistor 100. The resistor 96, the capacitor 98 and the resistor 100 form a part of the amplifier and buffer 50 as do the resistors 92 and 94. The resistor 94 forms a feedback path between the output and the second input of the amplifier 90, and the ratio of values of the resistors 92 and 94 determines the gain of the amplifier 90. The amplifier 90 therefore operates as a non-inverting amplifier. The tachometer 42 changes polarity with the direction of motion, and the amplifier 90 responds by amplifying the resulting signal of either polarity and providing it to the negative input of an amplifier 102 forming a part of the bipolar reference signal generator 48.

The amplifier 102 has a positive input coupled to ground and an output coupled to the summing junction 46 through resistors 104 and 106. The junction between the resistors 104 and 106 is coupled to ground through a diode bridge 108 which has a Zener diode. The amplifier 102 functions as a high gain amplifier without feedback, and saturates quickly in response to the bipolar signals at the output of the amplifier 90. The resulting signal provided to the summing junction 46 by the bipolar reference signal generator 48 comprises a voltage of substantially constant value which changes polarity each time the polarity of the voltage across the tachometer 42 changes. This signal which acts as a reference is compared with a signal from the amplifier and buffer 50 which varies directly with the signal at the tachometer 42 to provide an accurate representation of veocity. The algebraic sum of the signals at the summing junction 46 from the bipolar reference signal generator 48 and the amplifier and buffer 50 comprises an error signal indicating the amount by which the actual speed of the hammer bank 12 differs from the desired speed.

The desired speed represented by the reference signal from the bipolar reference signal generator 48 is selected by a clocking signal input to the phase locked loop 44 which determines the frequency of oscillation thereof and consequently the output which is coupled to the summing junction 46. The frequency of the clocking signal is typically on the order of about 1 kilohertz in the present example. At the same time the timing signals from the pulse generator 65 shown in FIG. 1 are applied to the phase locked loop 44. Any difference in the frequencies of the timing signals and the clocking signal results in the generation of a DC signal by the phase locked loop 44 which is applied to the summing junction 46. This eliminates the need to calibrate the tachometer 42.

The summing junction 46 is coupled to the negative input of an amplifier 110 comprising a part of the drive amplifier 38. The positive input of the amplifier 110 is grounded and the summing junction 46 is connected to the negative input. The feedback capacitor 112 is used to stabilize the amplifier 110. The output of amplifier 110 is connected to a linear amplifier circuit 114 comprising a pair of Darlington circuits coupled to positive and negative sources of like voltage. The linear amplifier circuit 114 is coupled to energize the linear actuator 30. The linear amplifier circuit 114 combines with the amplifier 110 to generate a relatively large current pulse by going into saturation each time the hammer bank 12 reverses and to thereafter provide a small current as necessary to drive the hammer bank at the nominal speed where it operates within its linear region.

Referring again to the waveforms of FIG. 5, it will be seen that as the velocity curve crosses zero at a point 116, the circuit of FIG. 6 responds by saturating in the appropriate direction to provide a relatively large pulse 118 to the actuator 30. This pulse combines with the natural rebound action of the actuator 30 to quickly accelerate the actuator to the desired nominal velocity as determined by the phase locked loop 44. When the actuator 30 accelerates to a speed approximately 70% of the nominal speed, the circuit of FIG. 6 leaves the saturation region and thereafter provides a relatively small current to the actuator 30 as necessary to enable the actuator to quickly reach the nominal speed at a point 120. At the point 120 the energizing current to the actuator 30 is reduced to zero or substantially to zero. Thereafter, as the actuator 30 undergoes linear motion in the given direction between its opposite limits, the circuit of FIG. 6 provides a relatively small amount of energizing current to the actuator 30 as necessary to compensate for friction losses and the like and maintain the nominal velocity of the actuator.

When the spool 66 of the linear actuator 30 has traveled to the extent that one of the shoulders 67, 68 thereof contacts the springs 84–87, which corresponds to a point 122 on the velocity curve of FIG. 5, the spool 66 and the hammer bank 12 which is directly coupled thereto rapidly decelerate. The circuit of FIG. 6 senses the resulting difference between actual and desired speed by providing an energizing current of increasing value to the linear actuator 30. When the speed of the actuator 30 has decreased to approximately 70% of the desired nominal speed, the circuit saturates and thereafter provides a relatively large pulse 124 to the actuator. Nevertheless, the actuator 30 continues to decelerate and comes to rest at a point 126 shown in FIG. 5 because of the resistance of the springs 84–87. Though the current pulse 124 opposes deceleration of the actuator 30, this energy is not wasted but rather is transferred to the resilient springs 84–87. When the spool 66 comes to rest at the point 126 and thereafter begins to reverse direction under the action of the springs 84–87, the additional energy from the current pulse 124 is returned by the springs 84–87 to the spool 66. At the same time the circuit of FIG. 6 which is in saturation and which reverses polarity at the point 126 of zero motion produces a relatively large pulse 128 so as to quickly accelerate the actuator 30. When the actuator 30 has accelerated to approximately 70% of the desired nominal speed, the circuit leaves the saturation state and provides a relatively small current to the actuator 30 as determined by the actual value of the reducing error signal at the summing junction 46. As the actuator 30 reaches the nominal speed represented by a point 130 on the velocity curve of FIG. 5 the energizing current provided by the circuit of FIG. 6 is reduced to zero or near zero and thereafter assumes relatively small values as necessary to compensate for friction losses and the like so as to maintain the linear motion of the actuator 30 at the selected nominal speed.

As the spool 66 reaches its opposite limit and one of the facing end shoulders 67, 68 thereof contacts the springs 84–87 at a point 132 shown on the velocity curve of FIG. 5, the actuator 30 begins to decelerate. When the actuator has decelerated to approximately 70% of nominal speed, the circuit of FIG. 6 saturates and thereafter produces a relatively large current pulse 134. As the actuator 30 decelerates to zero at a point 136 shown in FIG. 5 the circuit remains saturated but reverses polarity.

Startup of the circuit of FIG. 6 is aided by the serial combination of a capacitor 136 and a resistor 138 coupled between a positive voltage source and the summing junction 46 and a transistor 140 coupled between ground and the junction between the capacitor 136 and the resistor 138. When the hammer bank 12 is at rest there is no tachometer signal and therefore no reference signal at the summing junction 46. To provide such a signal for purposes of startup in the proper direction the transistor 140 is biased into conduction by application of a biasing signal to the base thereof. The capacitor 136 which has charged to 12 volts discharges, providing a current pulse to the summing junction 46. The current pulse provides the needed reference signal to properly start the system. Thereafter, as the tachometer 42 takes over and produces the reference signal the capacitor 136 acts to prevent the starting circuit from having any effect on the rest of the circuit. When the system is turned off, the bias is removed from the base of the transistor 140, allowing it to cease conducting and the capacitor 136 to again charge to 12 volts in readiness for the next startup.

It will be seen that in the linear actuator 30, the movable part of the actuator undergoes generally free flight and the resulting natural movement defines a cosine motion reversal which is the actual response of the spring mass and which serves to greatly minimize energy losses. Current is applied only as necessary to supplement the natural movement of the actuator. The control circuitry exercises precise control over the actuator during linear motion. During reversals however the nature of the arrangement is such that precise servo control is not necessary. Instead, the circuit simply saturates and in any event automatically reverses direction or polarity in response to zero motion of the actuator. Consequently the servoing current is always of the right polarity and compensates for losses in the system.

While the invention has been particularly shown and described with reference to a preferred embodiment thereof, it will be understood by those skilled in the art that various changes in form and details may be made therein without departing from the spirit and scope of the invention.

What is claimed is:

1. A reciprocating linear drive mechanism comprising:

reciprocable means;

linear magnetic actuator means coupled to said reciprocable means;

resilient means defining opposite limit positions along the travel of the reciprocable means and operative to be impacted by the reciprocable means to reverse the direction thereof at each of the opposite limit positions and to cause the reciprocable means to rebound from the resilient means;

means coupled to said linear actuator means for controlling the velocity of said reciprocable means between the limit positions, said means including means responsive to each rebounding of the reciprocable means from the resilient means for providing an energizing signal to the linear magnetic actuator means to insure to and maintenance of the reciprocable means at a desired velocity, a tachometer for generating a signal representing the velocity of the reciprocable means, means for providing a reference signal representing desired velocity of the reciprocable means, and means for energizing the magnetic actuator in accordance with any difference between the signal representing the velocity of the reciprocable means and the reference signal; and means responsive to the reciprocable means for generating pulses in response to increments of movement of the reciprocable means;

the means for providing a reference signal including means for providing a clocking signal of selected frequency and means responsive to the generated pulses and to the clocking signal for generating a signal representing the difference in frequency between the generated pulses and the clocking signal.

2. A reciprocating linear drive mechanism comprising:

means mounted to undergo reciprocating linear motion between opposite limit positions in response to energization thereof;

a tachometer for generating a velocity signal in response to motion of the means mounted to undergo reciprocating linear motion;

means for generating a timing signal which alternates with incremental amounts of motion of the means mounted to undergo reciprocating linear motion;

means for generating a clocking signal having a frequency representing desired velocity of the means mounted to undergo reciprocating linear motion;

means for generating a difference signal representing the difference in frequency of the timing signal and the clocking signal;

means responsive to the difference signal and to the polarity of the velocity signal for generating a reference signal; and means coupled to energize the means mounted to undergo reciprocating linear motion in response to the difference between the reference signal and the velocity signal.

3. The invention as set forth in claim 2, wherein the means for generating a difference signal comprises a phase locked loop and the means for generating a timing signal comprises first magnetic means having undulations along the length thereof mounted in the means mounted to undergo reciprocating linear motion, second magnetic means mounted on a fixed base adjacent the first magnetic means and operative to generate a cyclically varying signal in response to movement of the first magnetic means relative thereto, and means for generating a succession of pulses in response to the cyclically varying signal.

* * * * *

UNITED STATES PATENT AND TRADEMARK OFFICE
CERTIFICATE OF CORRECTION

PATENT NO. : 4,180,766
DATED : December 25, 1979
INVENTOR(S) : Jerry Matula

It is certified that error appears in the above-identified patent and that said Letters Patent are hereby corrected as shown below:

Column 2, line 68, after "each", "accelerator" should read --acceleration--. Column 3, line 45, after "with" and before "being", "carbon" should read --carbons--; line 58, after "in" and before "the", "wich" should read --which--. Column 5, line 53, after "It" and before "be", "wll" should read --will--. Column 10, line 5, after "insure" and before "to", insert --acceleration--.

Signed and Sealed this

Fifteenth Day of April 1980

[SEAL]

Attest:

SIDNEY A. DIAMOND

Attesting Officer

Commissioner of Patents and Trademarks